United States Patent [19]

Sinclair, Jr.

[11] 4,138,677
[45] Feb. 6, 1979

[54] ACCELERATION FILTER FOR SLOWDOWN DISCRIMINATION

[75] Inventor: Robert O. Sinclair, Jr., Morris Plains, N.J.

[73] Assignee: The United States of America as represented by the Secretary of the Army, Washington, D.C.

[21] Appl. No.: 519,164

[22] Filed: Jan. 6, 1966

[51] Int. Cl.² .................................................. G01S 9/44
[52] U.S. Cl. ......................................... 343/8; 324/162
[58] Field of Search ................. 343/8, 7.7; 340/3 D; 324/82, 162

[56] References Cited

U.S. PATENT DOCUMENTS 3,032,715   5/1962   Frye ............................. 324/162 X Primary Examiner—T.H. Tubbesing
Attorney, Agent, or Firm—Nathan Edelberg; Robert P. Gibson; Robert C. Sims

[57] ABSTRACT

A circuit for determining the acceleration of an object being tracked by a Doppler radar wherein a part of the received signal is delayed and then subtracted from the received signal to produce a first signal; a portion of the delayed signal is further delayed and then subtracted from the delayed signal to produce a second signal; and the first and second signals are subtracted to produce a signal representative of the acceleration of the object being tracked by the CW Doppler radar.

13 Claims, 5 Drawing Figures

Robert O. Sinclair Jr.,
INVENTOR.

ACCELERATION FILTER FOR SLOWDOWN DISCRIMINATION

This invention relates to an acceleration filter which is used in a discrimination radar so as to produce an output in which target amplitude will be proportional to target acceleration. The present invention is further related to a filter type device which is used to reject decoys and tank fragments having low balistic coefficients.

In the art of discrimination of dangerous radar tracks from nondangerous radar tracks, the need for an acceleration sensing device is a necessary and useful tool. By comparing the acceleration of particles in a cloud detected by the radar, the relative ballistic coefficients of the particles can be determined. The use of acceleration sensing makes the discrimination independent of minor differences in re-entry velocity among individual members of the cloud. Most acceleration devices in the past have contained too many elements and have a limited traffic-handling capability.

It is, therefore, an object of this invention to provide an acceleration filter which senses the acceleration of individual particles in a radar cloud.

A further object of the present invention is to provide a device which can determine the relative ballistic coefficients of particles in a cloud.

A still further object of the invention is to provide an acceleration discrimination device which is independent of minor differences in re-entry velocity among individual members contained in a radar cloud.

The invention further resides in and is characterized by various novel features of construction, combinations, and arrangements of parts which are pointed out with particularity in the claims annexed to and forming a part of this specification. Complete understanding of the invention and an introduction to other objects and features not specifically mentioned will be apparent to those skilled in the art to which it pertains when reference is made to the following detailed description of a specific embodiment thereof and read in conjunction with the appended drawing.

The drawing, which forms a part of the specification, presents the same reference characters to represent corresponding and like parts throughout the drawing, and wherein.

Figure 1:
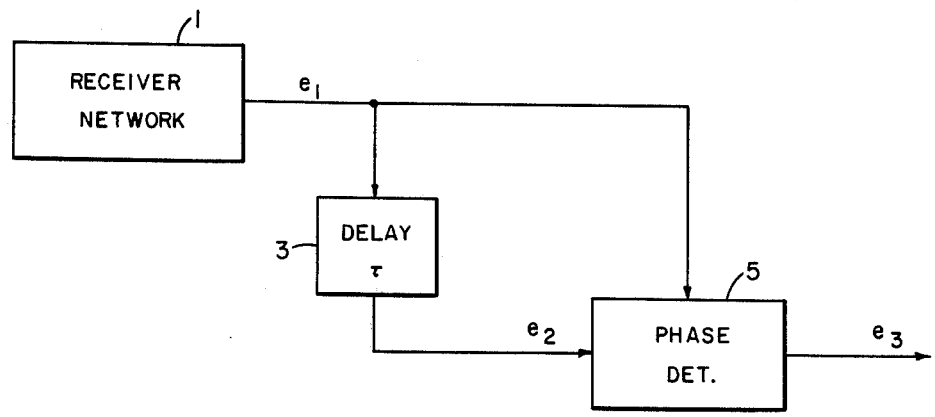
FIG. 1 shows a block for diagram illustrating a basic concept of the present invention.

In FIG. 1 a basic frequency and amplitude sensing circuit is shown connected to an output $e_1$ of a radar receiver 1. If the amplitude of the input signal is known or held constant by a limiter circuit, then the relative velocity of the target being detected can be determined by knowning the difference in the frequency transmitted and that received. The circuit of FIG. 1 can, therefore, be called a velocity sensing circuit, and it consists of a delay circuit 3 and a phase detector 5. The delay circuit will delay passage of the signal $e_1$ for a time $\tau$, without a change in the amplitude of the signal. The phase detector will have an output $e_3$ which is the product of the amplitude of the output of the delay circuit's output $e_2$ and the cosine of the phase angle $\theta$ between $e_1$ and $e_2$. The phase angle $\theta$ is dependent upon the frequency of the signal and, therefore, also dependent upon the relative velocity of the target.

The signal detected $e_1$ is the IF signal of the radar system. This is done so that one will not have to deal with the high frequencies of the direct return from the target. However, the circuits of this invention could be used as these frequencies just as well. This would involve more expensive circuit components though.

If a single frequency sine wave is applied to the circuit of FIG. 1 and $$e_1 = E e^{j\omega t} \qquad 1$$

then $$e_2 = E e^{j\omega(t-\tau)} \qquad 2$$

wherein E is the amplitude of the signals. The output of the phase detector will be $$e_3 = E \cos \theta \qquad 3$$

For the single frequency case $$\theta = \omega\tau \qquad 4$$

If the input signal $e_1$ was the IF signal from a CW doppler radar, the exact instantaneous frequency would be controlled by the doppler frequency and $$\omega = 2\pi f = 2\pi (f_o + f_d). \qquad 5$$

Wherein
 f = instantaneous frequency,
 $f_o$ = IF frequency return of a target due to the frequency of the radar transmitter, and
 $f_d$ = IF doppler frequency return of a target due to the relative velocity of the target and the radar system.

The IF doppler frequency is given by $$f_d = 2V/\lambda. \qquad 6$$

Wherein
 V = velocity in feet per second of the target relative to the radar system and
 $\lambda$ = wave length of the IF ($f_o$).

At 1400 megacycles, $f_d$ is equal to 2.83 V, and output of the circuit of FIG. 1 is $$e_3 = E \cos 2\pi (f_o + 2.83V)\tau. \qquad 7$$

Figure 2:
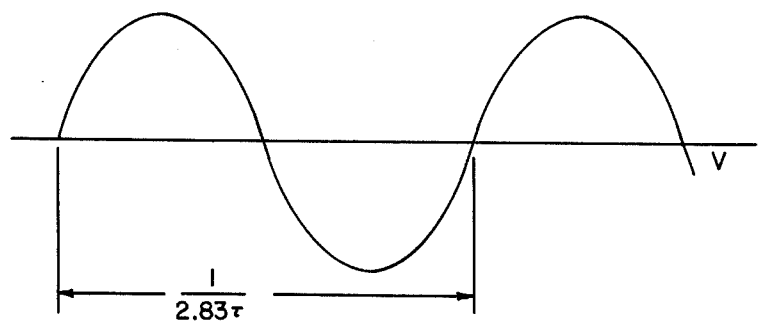
FIG. 2 illustrates the function of velocity to an output of FIG. 1.

It should be noted that $e_3$ is a periodic function in velocity, with a period (at 1400 megacyles) of $1/2.83\tau$ (see FIG. 2).

If the radar target is accelerating uniformly instead of moving at a constant velocity, then $\theta$ must be represented by the integral of the phase shift that has accumulated during the period $\tau$:

$$\theta = 2\pi \int_{t-\tau}^{t} (f_o + f_d)\, dt \qquad 8$$

$$= 2\pi f_o \tau + 2\pi \int_{t-\tau}^{t} 2.83 (V_o + at)\, dt \qquad 9$$

$$= 2\pi f_o \tau + 2.83 \times 2\pi (V_o \tau - \tfrac{1}{2} a\tau^2 + at\tau) \quad 10$$

Wherein
 a = acceleration,
 $V_o$ = relative velocity at the time t = 0, and
 $f_d$, at 1400, = 2.83 $(V_o + at)$.

Figure 3:
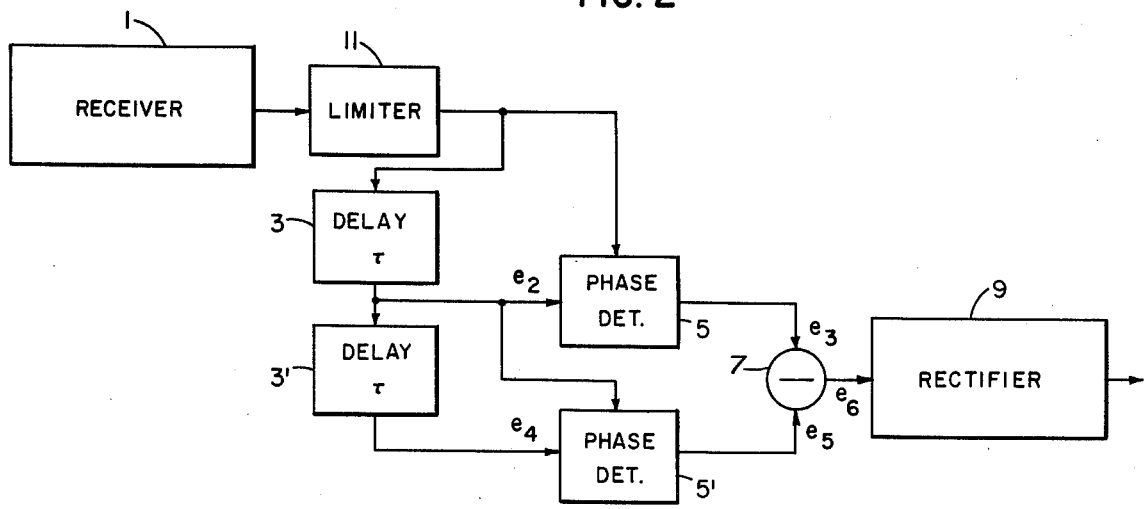
FIG. 3 is a schematic diagram illustrating a preferred form of the invention.

In order to obtain a true acceleration sensing circuit, two of the basic velocity sensing (or frequency detecting) circuits must be combined and subtracted from each other so as to minimize change in amplitude due to velocity and increase the change in amplitude due to acceleration. FIG. 3 shows the solution to this problem by the present invention. The delay circuits 3 and 3' and the phase detectors 5 and 5' perform the same functions as those described in FIG. 1. A subtraction coupler 7 is provided to subtract the outputs of the phase detectors from each other. A rectifier 9 may be provided between the signal output $e_6$ and a load (such as an A-scope or a computer input circuit). A limiter may also be provided is relieve dynamic range problems.

The output of the acceleration circuit of FIG. 1 is given by:

$$e_6 = e_3 - e_5 \quad 11$$

$$= E (\cos \theta_1 - \cos \theta_2) \quad 12$$

$$= -2E \sin \tfrac{1}{2} (\theta_1 + \theta_2) \sin \tfrac{1}{2} (\theta_1 - \theta_2) \quad 13$$

where $\theta_1$ and $\theta_2$ are the phase angles between $e_1$ and $e_2$ and between $e_2$ and $e_4$ respectively. $\theta_1$ was evaluated for constant acceleration above in equation 10:

$$\theta_1 = 2\pi f_o t + 2.83 \times 2\pi (V_o \tau - \tfrac{1}{2} a\tau^2 + at\tau). \quad 14$$

$\theta_2$ can be obtained from a similar integration between (t $-2\tau$) and $(t-\tau)$:

$$\theta_2 = 2\pi f_o \tau + 2.83 \times 2\pi (V_o \tau - \tfrac{3}{2} a\tau^2 + at\tau). \quad 15$$

Then $$\theta_1 + \theta_2 = 4\pi f_o \tau + 2.83 \times 4\pi (V_o \tau - a\tau^2 + at\tau), \quad 16$$

and $$\theta_1 - \theta_2 = 2.83 \times 2\pi a\tau^2, \quad 17$$

and $$e_6 = -A \sin (2\pi ft + \alpha), \quad 18$$

where $$A = 2E \sin 2.83 \times 2\pi \times (a\tau^2/2), \quad 19$$

$$f = 2.83 \; a\tau, \text{ and} \quad 20$$

$$\alpha = 2\pi f_o \tau + 2.83 \times 2\pi (V_o \tau - a\tau^2). \quad 21$$

As can be seen from the fact that both A and F increase as "a" increases from zero, the output of the circuit of FIG. 3 is proportional to the acceleration of the target with respect to the radar system.

Figure 4:
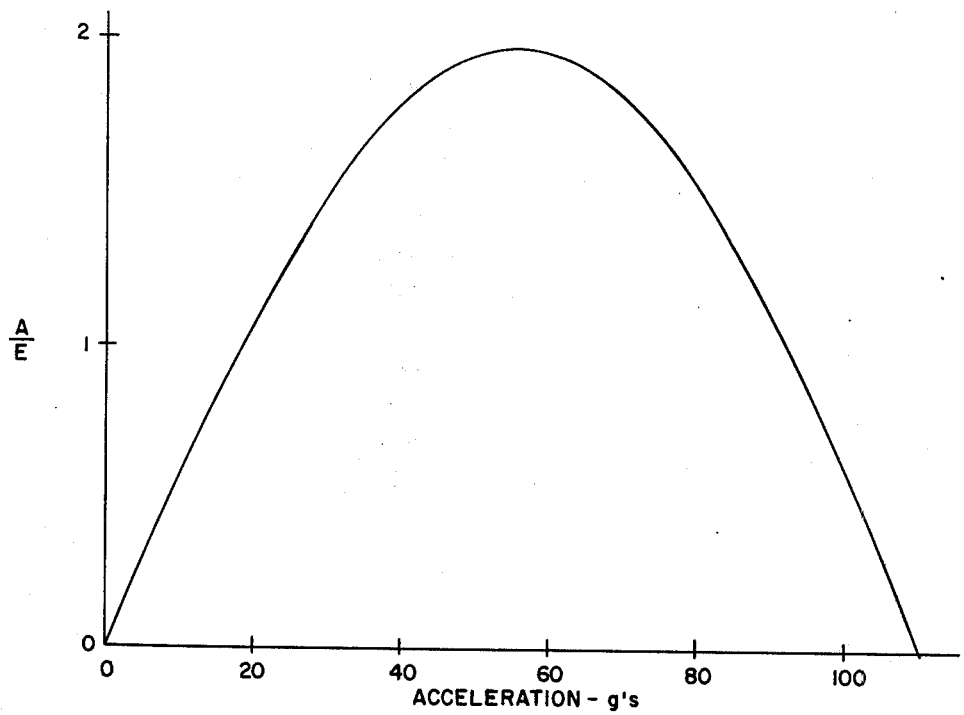
FIG. 4 is a graph illustrating a first component of an output of FIG. 3 with respect to acceleration.
Figure 5:
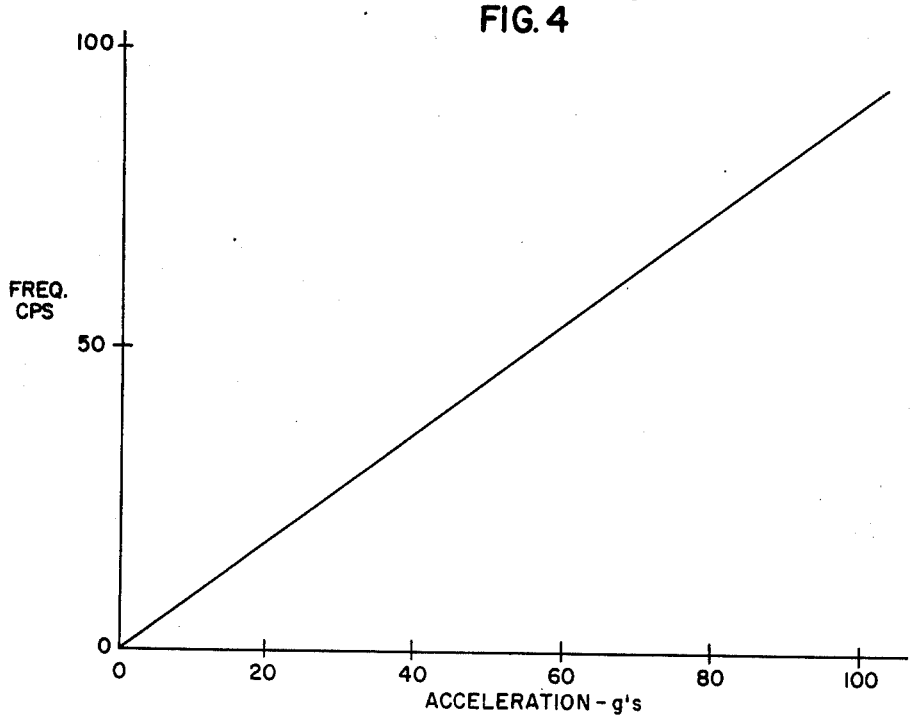
FIG. 5 is a graph illustrating a second component of the output of FIG. 3 with respect to acceleration.

So far, the analysis has been for a CW radar. It will also apply for a pulsed radar provided certain conditions are met. The transmitted pulses must be derived from a stable, coherent source, and the delay line circuit delay $\tau$ must be chosen to be equal to the pulse repetition period less a small correction for target motion. The PR repetition period is about 0.01 second, the period for the velocity response for the basic velocity filter will be $1/2.83\tau$ (35.4 feet per second). For $\tau = 0.01$ second, the values of A and f for the acceleration circuit output are given by FIGS. 4 and 5.

The output of the circuit of FIG. 3, when working with a pulse radar, will be a series of video pulses corresponding to the targets seen by the radar. These pulses will oscillate both positive and negative with both amplitude and frequency of oscillation controlled by target acceleration. To obtain a measure of the amplitude of the pulses without regard to sign, a rectifier 9 should follow the output of the circuit. Also, since signal-to-noise ratio cannot be expected to be very high, the rectifier output should be averaged over a half second or so. Averaging could be done with a recirculating video delay line.

The output of the basic acceleration circuit would be sensitive to the amplitude of the input signals without the inclusion of the limiter 11. Since the intention is only to detect acceleration, the limiter precedes the circuit. This features relieves dynamic range problems in the rest of the circuitry and makes the E factor in the equations constant for all detected targets; therefore difference in amplitude of different targets will be due to difference in acceleration of the targets.

If desirable, one could make use of a human operator with the acceleration filter of FIG. 3. An A-scope presentation of the output would be useful for this purpose. One might feed the output $e_6$ into a read-in element of a computer which is to carry out the discrimination task. This invention will allow detection of objects with low ballistic coefficients on the basis of acceleration measurements. The only fundamental limitation on the number of targets that can be handled is the resolution of the radar. By using acceleration measurement, discrimination is independent of minor differences in re-entry velocity among individual members of the cloud.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modification as are best adapted to the particular use contemplated. It will be apparent to those skilled in the art that changes may be made in the form of the apparatus disclosed without departing from the spirit of the invention as set forth in the disclosure, and that in some cases certain features of the invention may sometimes be used to advantage without a corresponding use of other features. It is, therefore, to be understood that within the scope of the appended claims the invention may be practiced otherwise than as specifically described. Accordingly, it is desired that the scope of the invention be limited only by the appended claims.

I claim:

1. A network comprising first and second phase detecting circuits each having an input and an output; a source of signals connected to the input of said first phase detecting circuit; delay means, said source of signals being connected to the input of said second phase detecting circuit by way of said delay means; and combining means connected to the outputs of said phase detecting circuits so as to combine the outputs into a single output.

2. A network as set forth in claim 1, wherein said delay means is part of said first phase detecting circuit.

3. A network as set forth in claim 2, wherein said combining means subtracts the outputs of said phase detecting circuits.

4. A network as set forth in claim 3, wherein said source of signals is the IF signals of a radar system.

5. A network as set forth in claim 4, further comprising a limiter connected between said source of signals and said first phase detecting circuit.

6. A network as set forth in claim 5, further comprising a rectifier means connected to an output of said combining means.

7. An acceleration filter comprising first and second delay circuits each having an input and an output; first and second phase detectors each having two inputs and an output; a source of signals connected to the input of said first delay circuit and to one input of said first phase detector; the output of said first delay circuit being connected to the other input of said first phase detector, one input of said second phase detector and to the input of said second delay circuit; the output of said second delay circuit being connected to the other input of said second phase detector; and a combining means, the output of said phase detectors being combined into a single output by said combining means.

8. An acceleration filter as set forth in claim 7, wherein said combining means subtracts the outputs of said phase detectors.

9. An acceleration filter as set forth in claim 8, wherein said source of signals is the IF signals of a radar system.

10. An acceleration filter as set forth in claim 9, further comprising a limiter circuit connected between said source of signals and its connections to the delay circuit and phase detector.

11. An acceleration filter as set forth in claim 10, wherein said radar system is a CW radar system.

12. An acceleration filter as set forth in claim 10, wherein said radar system is a pulse radar system.

13. An acceleration filter as set forth in claim 12, further comprising a rectifier means connected to an output of said combining means.

* * * * *